US006998176B2

(12) United States Patent
Morita et al.

(10) Patent No.: US 6,998,176 B2
(45) Date of Patent: Feb. 14, 2006

(54) FINE CARBON FIBER, METHOD FOR PRODUCING THE SAME AND ELECTRICALLY CONDUCTING MATERIAL COMPRISING THE FINE CARBON FIBER

(75) Inventors: Toshio Morita, Kanagawa (JP); Hitoshi Inoue, Kanagawa (JP); Kunio Nishimura, Kanagawa (JP); Yutaka Suhara, Nara (JP); Satoshi Ohshima, Ibaraki (JP); Motoo Yumura, Ibaraki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/699,645

(22) Filed: Nov. 4, 2003

(65) Prior Publication Data

US 2004/0131848 A1    Jul. 8, 2004

Related U.S. Application Data

(62) Division of application No. 10/254,674, filed on Sep. 26, 2002, now Pat. No. 6,699,582, which is a division of application No. 09/832,792, filed on Apr. 12, 2001, now Pat. No. 6,489,025.

(60) Provisional application No. 60/268,058, filed on Feb. 13, 2001.

(30) Foreign Application Priority Data

Apr. 12, 2000   (JP) .......................... P2000-110675

(51) Int. Cl.
*D01F 9/12*   (2006.01)
(52) U.S. Cl. .................................. 428/367; 428/447.1

(58) Field of Classification Search ................. 428/367, 428/397, 401; 423/447.1
See application file for complete search history.

(56) References Cited

U.S. PATENT DOCUMENTS

| 4,663,230 A | 5/1987 | Tennent |
| 6,099,960 A | 8/2000 | Tennent et al. |
| 6,221,489 B1 | 4/2001 | Morita et al. |

FOREIGN PATENT DOCUMENTS

| JP | 60-27700 | 2/1985 |
| JP | 60-54998 | 3/1985 |
| JP | 61-70014 | 4/1986 |
| JP | 1-62366 | 4/1989 |
| JP | 3-64606 | 10/1991 |
| JP | 7-154019 | 6/1995 |
| WO | WO 90-07023 | 6/1990 |

*Primary Examiner*—N. Edwards
(74) *Attorney, Agent, or Firm*—Sughrue Mion, PLLC

(57) ABSTRACT

A fine carbon fiber having an outer diameter of about 1 to about 80 nm and an aspect ratio of 10 to 30,000, comprising a hollow center portion and a multi-layer sheath structure of a plurality of carbon layers, the layers forming annual rings, wherein the sheath-forming carbon layers form an incomplete sheath, i.e., the carbon layers are partially broken or disrupted in a longitudinal direction, and the outer diameter of the carbon fiber and/or the diameter of the hollow center portion are not uniform in a longitudinal direction. The carbon fiber is obtained by instantaneously reacting a carrier gas at a high temperature and an organic compound gas kept at a temperature below the decomposition temperature of the transition metal compound and has a conductivity equivalent to that of a conventional vapor phase method and is useful as a filler material in resins, rubbers, paints and the like.

5 Claims, 5 Drawing Sheets

HEAT TREATMENT AT 1300°C

HEAT TREATMENT AT 2800°C

FINE CARBON FIBER, METHOD FOR PRODUCING THE SAME AND ELECTRICALLY CONDUCTING MATERIAL COMPRISING THE FINE CARBON FIBER

CROSS REFERENCE TO RELATED APPLICATION

This is a divisional of application Ser. No. 10/254,674, filed on Sep. 26, 2002 is now U.S. Pat. No. 6,699,582, which is a divisional of application Ser. No. 09/832,792 filed Apr. 12, 2001, now U.S. Pat. No. 6,489,025, which claims benefit of Provisional Application No. 60/268,058, filed Feb. 13, 2001, the disclosures of which are incorporated herein by reference. This application is based on Japanese Patent Application No. 2001-10675 filed Apr. 12, 2000, the contents of which are incorporated herein by reference.

FIELD OF THE INVENTION

The present invention relates to a fine carbon fiber having a specific structure and to a production process therefor; and more particularly to a fine carbon fiber suitable as a filler used in composite materials, such as resin- or rubber-based composite materials, and to a production process for the carbon fiber. The present invention also relates to a conducting material comprising such a fine carbon fiber.

BACKGROUND OF THE INVENTION

Carbon fibers are used in a variety of composite materials because of their excellent characteristics such as high strength, high elastic modulus, and high conductivity. In addition, carbon fibers exhibit excellent mechanical strengths. Due to their conductivity, carbon fibers or carbon materials can be utilized in a variety of fields. In recent years, in conjunction with developments in electronic techniques, carbon fibers have been regarded as a promising filler in conducting resins for producing electromagnetic shielding materials or antistatic materials. Also, with the trend that resins have come to be used in the manufacture of automobiles in order to reduce their weight, carbon fibers have been seen as a useful antistatic filler that can be incorporated into the resins employed in automobiles.

Conventional carbon fibers, i.e., organic carbon fibers, are produced on a large scale by subjecting organic fibers, such as PAN-, pitch-, or cellulose-based fibers, to heat treatment and carbonization. In general, when carbon fibers are used as a filler in fiber-reinforced composite materials, in order to increase the contact area between the carbon fiber and the matrix of the material, the diameter of the fiber is reduced or the length thereof is increased. As a result, the reinforcement effect on the composite material is enhanced. In order to improve adhesion between the carbon fiber and the matrix, the carbon fiber preferably has a rough surface rather than a smooth surface. Therefore, the carbon fiber is subjected to surface treatment. For example, the carbon fiber is oxidized by exposure to air at a high temperature, or a coating agent is applied onto the surface of the fiber.

However, conventionally, it has been impossible to produce fine carbon fibers since the filament of organic fiber as the raw material has a diameter of at least about 5 to 10 μm. Furthermore, the ratio of length to diameter (i.e., aspect ratio=length/diameter) of conventional carbon fiber is limited. Because of these limitations, there has been a keen demand for the development of carbon fibers of a small diameter and a high aspect ratio.

When carbon fibers are incorporated into resins used for producing an automobile body, or in resins or rubbers for producing an electronic device, the carbon fibers must have conductivity comparable to that of a metal. Therefore, carbon fibers serving as a filler material have been required to have an improved conductivity.

In order to improve conductivity, carbon fibers must be subjected to graphitization to thereby increase the degree of crystallinity. Therefore, carbon fibers are usually subjected to graphitization at a high temperature. However, even when carbon fibers are subjected to such a graphitization, they still fail to attain conductivity comparable to that of a metal. Therefore, when a composite material is produced by use of a carbon fiber, in order to compensate for a low conductivity of carbon fiber itself, a large amount of carbon fiber is to be incorporated into the composite material. However, in this case, the workability and mechanical characteristics of the composite material are impaired. Therefore, in view of practical use, it is necessary to make further improvements to the conductivity of carbon fiber. In addition, it is also necessary to enhance the strength of the carbon fiber by reducing its diameter.

In the late 1980's, a vapor grown carbon fiber was produced through a process that differed from that used for producing a carbon fiber through carbonization and graphitization from an organic fiber such as PAN.

The vapor grown carbon fiber (hereinafter abbreviated as "VGCF") is produced through thermal decomposition of hydrocarbon gas in a vapor phase in the presence of a metallic catalyst. Through this process, a carbon fiber having a diameter of hundreds of nm to 1 μm can be produced.

A variety of processes for producing VGCF are known, including a process in which an organic compound such as benzene, serving as a raw material, and an organic transition metal compound such as ferrocene, serving as a metallic catalyst, are introduced into a high-temperature reaction furnace together with a carrier gas, to thereby produce VGCF on a substrate (Japanese Patent Application Laid-Open (kokai) No. 60-27700); a process in which VGCF is produced in a free state (Japanese Patent Application Laid-Open (kokai) No. 60-54998); and a process in which VGCF is grown on a reaction furnace wall (Japanese Patent Application Laid-Open (kokai) No. 7-150419).

Through the aforementioned processes, there can be produced a carbon fiber of a relatively small diameter and a high aspect ratio that exhibits excellent conductivity and is suitable as a filler material. Therefore, a carbon fiber having a diameter of about 100 to 200 nm and an aspect ratio of about 10 to 500 is mass-produced, and is used, for example, as a conducting filler material in conducting resins or as an additive in lead storage batteries.

A characteristic feature of a VGCF filament resides in its shape and crystal structure. A VGCF filament has a structure including a very thin hollow part in its center portion, and a plurality of carbon hexagonal network layers whose crystals surround the hollow part like annual rings.

However, conventionally, VGCF having a small diameter of less than 100 nm cannot be produced on a large scale.

Recently, Iijima, et al. have discovered a multi-layer carbon nano-tube, which is a type of carbon fiber having a diameter smaller than that of VGCF, derived from soot obtained by evaporating a carbon electrode through arc discharge in helium gas. The multi-layer carbon nano-tube has a diameter of 1 to 30 nm, and is a fine carbon fiber filament having a structure similar to that of a VGCF filament. That is, the tube has a structure including a hollow part in its center portion, and a plurality of carbon hexagonal network layers whose crystals are superimposed in the form of annular rings around the hollow part.

However, the above process for producing the nano-tube through arc discharge is not carried out in practice, since the process is not suitable for mass production.

Meanwhile, a carbon fiber having a high aspect ratio and exhibiting a high conductivity could possibly be produced through the vapor-growth process, and therefore attempts have been made to improve the vapor-growth process for the production of carbon fiber of a smaller diameter. For example, U.S. Pat. No. 4,663,230 and Japanese Patent Examined Publication (kokoku) No. 3-64606 disclose a graphitic cylindrical carbon fibril having a diameter of about 3.5 to 70 nm and an aspect ratio of 100 or more. The carbon fibril has a structure in which a plurality of layers of ordered carbon atoms are continuously disposed concentrically about the cylindrical axis of the fibril, and the C-axis of each of the layers is substantially perpendicular to the cylindrical axis. The entirety of the fibril includes no thermally decomposed carbon overcoat deposited through thermal decomposition, and has a smooth surface.

Japanese Patent Application Laid-Open (kokai) No. 61-70014 discloses a carbon fiber having a diameter of 10 to 500 nm and an aspect ratio of 2 to 30,000, which fiber is produced through a vapor-growth process. According to this publication, a carbon layer obtained through thermal decomposition has a thickness of 20% or less of the diameter of the carbon fiber.

The both carbon fibers described above have smooth fiber surfaces. They exert substantially no frictional force because their surfaces are less uneven and they exhibit poor chemical reactivity since they have smooth fiber surfaces. Therefore, when such a carbon fiber is used in a composite material, the fiber must be subjected to surface treatment; for example, the surface of the fiber must be subjected to a satisfactory degree of oxidation.

SUMMARY OF THE INVENTION

In view of the foregoing, an object of the present invention is to provide a fine carbon fiber, which has a diameter of less than 100 nm, exhibits a high conductivity and an excellent adhesion to materials such as a resin or rubber, and is suitable as a filler material.

Another object of the present invention is to provide a method for producing such a carbon fiber.

Still another object of the present invention is to provide a conducting material comprising such a carbon fiber.

The present inventors provide a novel carbon fiber having a structure totally different from that of a conventional carbon fiber. Accordingly, the present invention provides:

1) A fine carbon fiber having an outer diameter of about 1 to about 80 nm and an aspect ratio of 10 to 30,000, comprising a hollow center portion and a multi-layer sheath structure of a plurality of carbon layers (also referred to as "carbon sheets"), the layers forming concentric rings, wherein the sheath-forming carbon layers form an incomplete sheath, i.e., the carbon layers are partially broken or disrupted in a longitudinal direction, and the outer diameter of the filament and/or the diameter of the hollow center portion are not uniform in a longitudinal direction;
2) The fine carbon fiber according to 1) above, wherein the thickness or structure of the carbon layers is partially asymmetrical with respect to the hollow center portion;
3) The fine carbon fiber having an outer diameter of about 1 to about 80 nm and an aspect ratio of 10 to 30,000, comprising the fine carbon fiber as recited in 1) or 2) above in an amount of about 10 mass % or more;
4) The fine carbon fiber obtained through heat treatment of the fine carbon fiber as recited in any one of 1) to 3) above;
5) The fine carbon fiber according to 4) above, wherein the heat treatment is carried out at about 900 to about 3,000° C.;
6) A fine carbon fiber having an outer diameter of about 1 to about 80 nm, an aspect ratio of 10 to 30,000, R value $(I_D/I_G)$ by Raman spectrophotometry of about 0.6 to about 1.6, and an interplane distance $C_0$ by X-ray diffraction of 6.70 to 6.95 Angstroms, and having a cross-section perpendicular to the longitudinal direction of fiber being of a polygonal shape, the fiber comprising a hollow center portion and a multi-layer sheath structure of a plurality of carbon layers;
7) A fine carbon fiber having an outer diameter of about 1 to about 80 nm, an aspect ratio of 10 to 30,000, R value $(I_D/I_G)$ by Raman spectrophotometry of about 0.1 to about 1, and an interplane distance $C_0$ by X-ray diffraction of 6.70 to 6.90 Angstroms, and having a cross-section perpendicular to the longitudinal direction of filament being of a polygonal shape, the fiber comprising a hollow center portion and a multi-layer sheath structure of a plurality of carbon layers;
8) The fine carbon fiber according to 6) or 7) above, having an outer diameter of about 1 to about 80 nm and an aspect ratio of 10 to 30,000, and having a cross-section perpendicular to the longitudinal direction of filament being of a polygonal shape, each filament comprising a hollow center portion and a multi-layer sheath structure of a plurality of carbon layers in the form of annular rings around the hollow part;
9) The fine carbon fiber having an outer diameter of about 1 to about 80 nm and an aspect ratio of 10 to 30,000, comprising the fine carbon fiber as recited in any one of 6) to 8) above in an amount of about 10 mass % or more;
10) A method for producing fine carbon fiber, which process comprises a step of causing an organic compound solution containing an organic transition metal compound and, optionally a sulfur compound to vaporize, and feeding the vaporized solution to a reaction furnace while the temperature of the solution is maintained below the decomposition temperature of the organic transition metal compound; a step of feeding a carrier gas which has been heated to a high temperature to the reaction furnace through a path separate from that of the solution; and a step of causing the vaporized solution and the carrier gas to be combined in a heated reaction zone of about 700 to about 1,300° C. in the reaction furnace, to thereby carry out reaction instantaneously;
11) The method for producing fine carbon fiber according to 10) above, wherein the preliminary heating temperature is about 500 to about 1,300° C.;
12) The fine carbon fiber according to any one of 1) to 3) and 6) to 9), produced by a production process comprising a step of causing an organic compound solution containing an organic transition metal compound and, optionally a sulfur compound to vaporize, and feeding the vaporized solution to a reaction furnace while the temperature of the solution is maintained below the decomposition temperature of the organic transition metal compound; a step of feeding a carrier gas which has been heated to a high temperature to the reaction furnace through a path separate from that of the solution; and a step of causing the vaporized solution and the carrier gas to be combined in a heated reaction zone of about 700 to about 1,300° C. in the reaction furnace, to thereby carry out reaction instantaneously;

13) The fine carbon fiber according to any one of 1) to 3) and 6) to 9), comprising further subjecting to heat treatment the fine carbon fiber produced by a production process comprising a step of causing an organic compound solution containing an organic transition metal compound and, optionally a sulfur compound to vaporize, and feeding the vaporized solution to a reaction furnace while the temperature of the solution is maintained below the decomposition temperature of the organic transition metal compound; a step of feeding a carrier gas which has been heated to a high temperature to the reaction furnace through a path separate from that of the solution; and a step of causing the vaporized solution and the carrier gas to be combined in a heated reaction zone of about 700 to about 1,300° C. in the reaction furnace, to thereby carry out reaction instantaneously;

14) The fine carbon fiber according to 13) above, wherein the heat treatment temperature is about 900 to about 3,000° C.;

15) The fine carbon fiber according to any one of 12) to 14) above, wherein the preliminary heating temperature is about 500 to about 1,300° C.;

16) A conducting material comprising the fine carbon fiber according to any one of 1) to 9) and 12) to 15).

DESCRIPTION OF THE PRESENT INVENTION

Figure 1A:
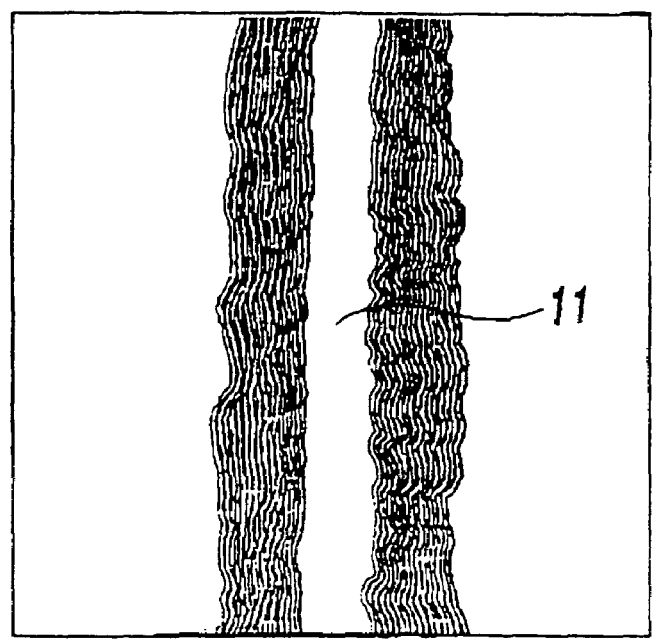
FIG. 1A is a schematic representation showing an example of the structure of the fine carbon fiber of the present invention.

Hereinafter, the present invention will be described in detail.

A characteristic feature of the production process for fine carbon fiber of the present invention resides in that an organic compound solution, serving as raw material and also a catalyst, is vaporized and fed to a reaction furnace while the temperature of the solution is maintained below the decomposition temperature of an organic transition metal compound serving as a catalyst; a carrier gas which has been heated to a high temperature is fed to the reaction furnace through a path separate from that of the vaporized solution; and the vaporized solution and the carrier gas are combined instantaneously in a heated reaction zone of 700 to 1,300° C. in the reaction furnace for the first time. Since the carrier gas can be fed to the reaction zone through a path separate from that of the vaporized raw material in a state where it is heated to at least the decomposition temperature of the organic transition metal compound, i.e., a temperature in the vicinity of the reaction temperature, reaction proceeds rapidly after the raw material and the carrier gas are combined. Since the carrier gas is fed through a path separate from that of the vaporized raw material, the raw material is not heated to an abnormally high temperature. Therefore, decomposition of the transition metal compound is not initiated before it can get in the reaction furnace. As a result, a fine carbon fiber is grown in the furnace.

In the production process for a fine carbon fiber of the present invention, the organic transition metal compound that can be used as a metallic catalyst is a compound including at least one species selected from metal elements belonging to the groups IVa, Va, VIa, VIIa, and VIII in the periodic table. Preferably, a metallocene compound such as ferrocene or nickelocene is used. In the present invention, the amount of the transition metal in the catalyst is about 0.03 to about 10.0 mass %, preferably about 0.1 to about 5.0 mass %, on the basis of the amount of carbon in the catalyst.

In addition, a sulfur compound may be used as a promoter. The type of the sulfur compound is not particularly limited, so long as it dissolves in an organic compound such as benzene or toluene serving as a carbon source. Examples of such sulfur compounds include thiophene, thiols, and inorganic sulfur. The amount of the sulfur compound is about 0.01 to about 5.0 mass %, preferably about 0.1 to about 3.0 mass %, on the basis of the organic compound.

Examples of organic compounds serving as a carbon source for producing a carbon fiber include benzene, toluene, xylene, methanol, ethanol, naphthalene, phenanthrene, cyclopropane, cyclopentene, cyclohexane, and mixtures thereof. Alternatively, volatile oil, kerosene, or gas such as CO, natural gas, methane, ethane, ethylene, or acetylene may be used as a carbon source. Of these, an aromatic compound, such as benzene, toluene, or xylene, is particularly preferred.

Hydrogen gas is usually used as a carrier gas. In the present invention, the carrier gas is heated in advance, preferably to 500 to 1,300° C., more preferably 700 to 1,300° C. The carrier gas is heated so that upon the reaction, the formation of metallic grains of catalyst can occur simultaneously with the supply of a carbon source due to the thermal decomposition of an organic compound, to thereby allow the reaction to occur instantaneously.

In the case in which the carrier gas is combined with a raw material gas containing an organic compound and a transition metal compound, the temperature of the carrier gas lower than 500° C. does not allow the thermal decomposition of the organic compound serving as a raw material to occur easily. In contrast, when the temperature of the carrier gas is higher than 1,300° C., carbon fiber is grown in its radial direction, and the diameter of the fiber tends to become large.

In the production process of the present invention, appropriate proportions by mol % of a transition metal compound, an organic compound, and carrier gas are about (0.005–0.2):(0.5–6):(94–99.5), and their total amount is 100 mol %.

In order to produce carbon fiber having a minute diameter, where hydrogen gas is used as the carrier gas, the proportion of hydrogen gas is set at 90 mol % or more, preferably 94 mol % or more, and more preferably 96 mol % or more; i.e., the proportion (mol %) of the organic compound serving as a carbon source is preferably lowered.

When ferrocene is used as a transition metal compound, the vaporized raw material gas must be maintained at a temperature within a range of 200 to 400° C. until the gas is fed to a reaction furnace. When the temperature of the vaporized raw material gas is in excess of 450° C., the vaporized organic transition metal compound thermally decomposes, and the atomized transition metal begins to aggregate. Unless decomposition of the organic compound serving as the carbon source accompanies the decomposition of the transition metal compound, no carbon fiber is produced. A carbon fiber is grown on the atomized transition metal serving as a nucleus, and thus the size of the metal determines the diameter of the grown carbon fiber. Briefly, when the transition metal particles aggregate and the secondary particle size of the resultant metal aggregation becomes large, the diameter of the carbon fiber grown on the aggregation becomes large. Therefore, the temperature of the raw material gas must be maintained below the decomposition temperature of the transition metal compound until the gas is fed to the reaction furnace.

Preferably, the raw material gas containing an organic compound and a transition metal compound is instantaneously introduced into a heated zone in the reaction furnace while the temperature of the raw material gas is maintained below the decomposition temperature of the transition metal compound, and simultaneously a carrier gas (e.g., hydrogen gas) heated at 500 to 1,300° C. is introduced into the zone through a path separate from that of the raw material gas. The zone in the reaction furnace is heated to 700 to 1,300° C., preferably 1,000 to 1,300° C.

Usually, a cylindrical electric furnace is used as the reaction furnace. The furnace preferably includes, for example, pipes or tubes through which the raw material gas and the carrier gas are fed, such that both gasses are fed directly to a zone heated at a predetermined temperature. In this case, a pipe for feeding the raw material gas and a pipe for feeding the heated carrier gas are preferably separated from each other, in order to facilitate control of the temperature of the raw material gas. As used herein, the phrase "the raw material gas is instantaneously introduced" refers to the raw material gas being fed to the reaction furnace through a pipe such that the time during which the gas is heated in the pipe at or above the decomposition temperature of the organic transition metal compound is 0.5 second or less, preferably 0.1 second or less. In order to control the temperature of the raw material gas as described above, the pipes for feeding both gasses must be provided in the zone heated at a predetermined temperature such that the ends of the pipes are close to each other, and if necessary, the pipes are thermally insulated.

When the raw material gas introduced into the reaction furnace thermally decomposes, the organic compound serves as a carbon source, and transition metal particles derived from the organic transition metal compound serve as a catalyst, to thereby produce fine carbon fiber on the transition metal particles serving as a nucleus. If necessary, the resultant carbon fiber is optionally subjected to heat treatment at 900 to 3,000° C., more particularly at 900 to 1,900° C. or 2,000 to 3,000° C. depending on the utilities, to thereby obtain a unique fine carbon fiber of the present invention.

The heat treatment may be carried out once or in plural times stepwise. The maximum temperature and retention time of the heat treatment determine the physical properties, structure and the like of the resulting carbon fiber. The retention time is influenced by the type of apparatus, the treating amount, density, diameter and aspect ratio of carbon fiber and the like and thus is not generally determined. However, usually the heat treatment is carried out for several minutes to several hours, preferably 10 minutes to about 3 hours.

The heat treatment may be carried out in a customary electric furnace. In order to prevent nitridation of the surface of the carbon fiber, the heat treatment is preferably carried out in an inert gas atmosphere other than $N_2$ (for example, argon, helium or the like). The heat treatment renders the carbon fiber to have a more excellent conductivity than the fiber filaments obtained without heat treatment.

Fine carbon fiber of the present invention will now be described.

The carbon fiber of the present invention is featured in:
1) a fine carbon fiber having an outer diameter of about 1 to about 80 nm and an aspect ratio of 10 to 30,000, comprising a hollow center shaft and a multi-layer sheath structure of a plurality of carbon layers, the layers forming annual rings, wherein the sheath-forming carbon layers form an incomplete sheath, i.e., the carbon layers are partially broken or disrupted in a longitudinal direction, and the outer diameter of the fiber and/or the diameter of the hollow center portion are not uniform in a longitudinal direction;
2) a fine carbon fiber according to 1) above, wherein the thickness or structure of the carbon layers is partially asymmetrical with respect to the hollow center portion; and
3) a fine carbon fiber having an outer diameter of about 1 to about 80 nm and an aspect ratio of 10 to 30,000 comprising the fine carbon fiber as recited in 1) or 2) above in an amount of about 10 mass % or more.

The fine carbon fiber has a structure similar to that of carbon fiber produced through the aforementioned conventional vapor-growth process, but the fiber of the present invention is characterized by the following points.

Figure 1B:
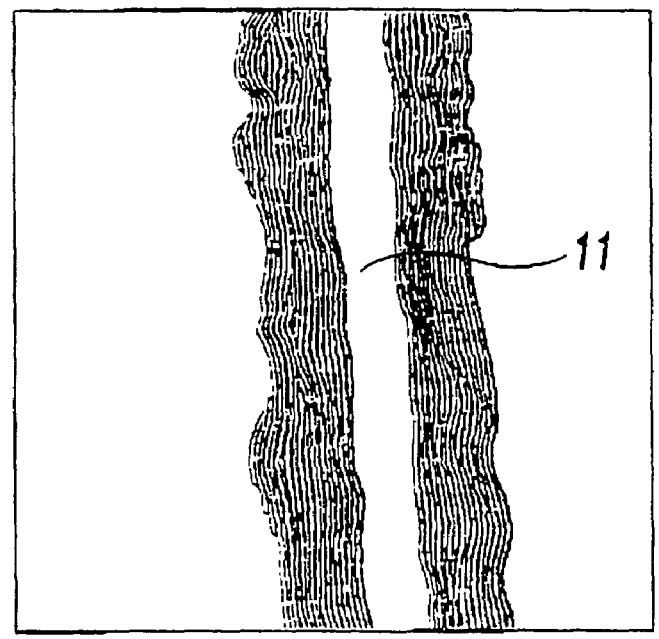
FIG. 1B is a schematic representation showing another example of the structure of the fine carbon fiber of the present invention.
Figure 3:
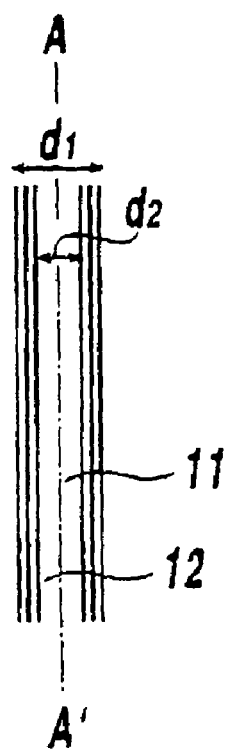
FIG. 3 illustrates a carbon fiber produced through a conventional vapor-growth process.
Figure 4:
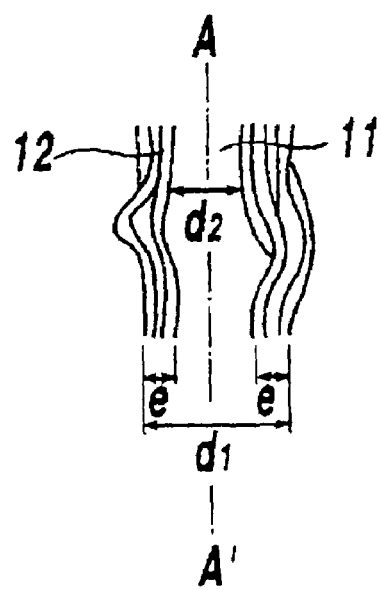
FIG. 4 illustrates a fine carbon fiber produced through the process of the present invention.

Firstly, with regard to the structure, the carbon fiber has a multi-layer sheath structure of a plurality of carbon layers formed from carbon atoms, in which the layers form like annual rings. The carbon layers are formed of regularly ordered carbon atoms. FIGS. 1A and 1B show schematic representations of the carbon fiber as observed under a transmission electron microscope (TEM) in a longitudinal direction. As shown in these figures, most carbon layers are grown in a horizontal direction (longitudinal direction) so as to form a plurality of direct lines. Therefore, the structure of the carbon fiber seems to be similar to that of a conventional vapor-grown carbon fiber. However, the carbon fiber of the present invention differs from the conventional carbon fiber in that the sheath-forming carbon layers are partially broken or disrupted in a longitudinal direction. FIG. 3 illustrates a conventional vapor-grown carbon fiber including a hollow center portion 11, and carbon layers 12 forming concentric rings, which layers are regularly grown symmetrically with respect to the center shaft A–A'. FIG. 4 illustrates the fine carbon fiber including carbon layers 12, which layers are asymmetrical with respect to a center shaft A–A'. As shown in FIG. 4, the carbon layers form an incomplete sheath, and most carbon layers are partially lost or disrupted between adjacent sheath-forming carbon layers.

The carbon fiber of the present invention is similar to the conventional carbon fiber in that the fiber contains a hollow center portion 11. However, the carbon fiber of the present invention is characterized in that the inner diameter $d_2$ of the center portion 11 is not uniform.

In the fine carbon fiber of the present invention, the carbon layers 12 are asymmetrical with respect to the center axis A–A' of the hollow part 11 in the central part thereof; the thicknesses e of the layers 12 differ from portion to portion. For example, the carbon layers 12 are thickened so as to increase the outer diameter of the carbon fiber or to reduce the inner diameter of the hollow center portion 11 as compared with an imaginary complete cylindrical sheath, resulting in that the outer diameter $d_1$ of the carbon fiber or the diameter $d_2$ of the hollow center portion 11 varies greatly in accordance with variation in the thickness e. Variation in the outer diameter $d_1$ or the diameter $d_2$ may reach about 10 and some % of the minimum diameter of the filament in some portions in which the thickness e varies greatly and about 2 to 3% of the minimum diameter of the carbon fiber in some portions in which the thickness e varies slightly. These portions where variations in thickness e are observed form protrusions extending in some portions in a longitudinal direction of the carbon fiber. As described above, a characteristic feature of the fine carbon fiber resides in that the carbon fiber does not have a perfect columnar shape.

In a portion of the carbon layers in which the thickness e is large, the carbon layers 12 disrupted in a longitudinal direction enter therebetween, and the number of layers increases. Alternatively, in such a portion, end surfaces of the carbon layers 12 are exposed to the outside. As used herein, the term "the thickness e of the carbon layers 12" refers to the distance between a position at the circumference of the carbon fiber and a position at the circumference of the hollow center portion 11, the distance being measured in a radial direction of the carbon fiber.

Figure 5A:
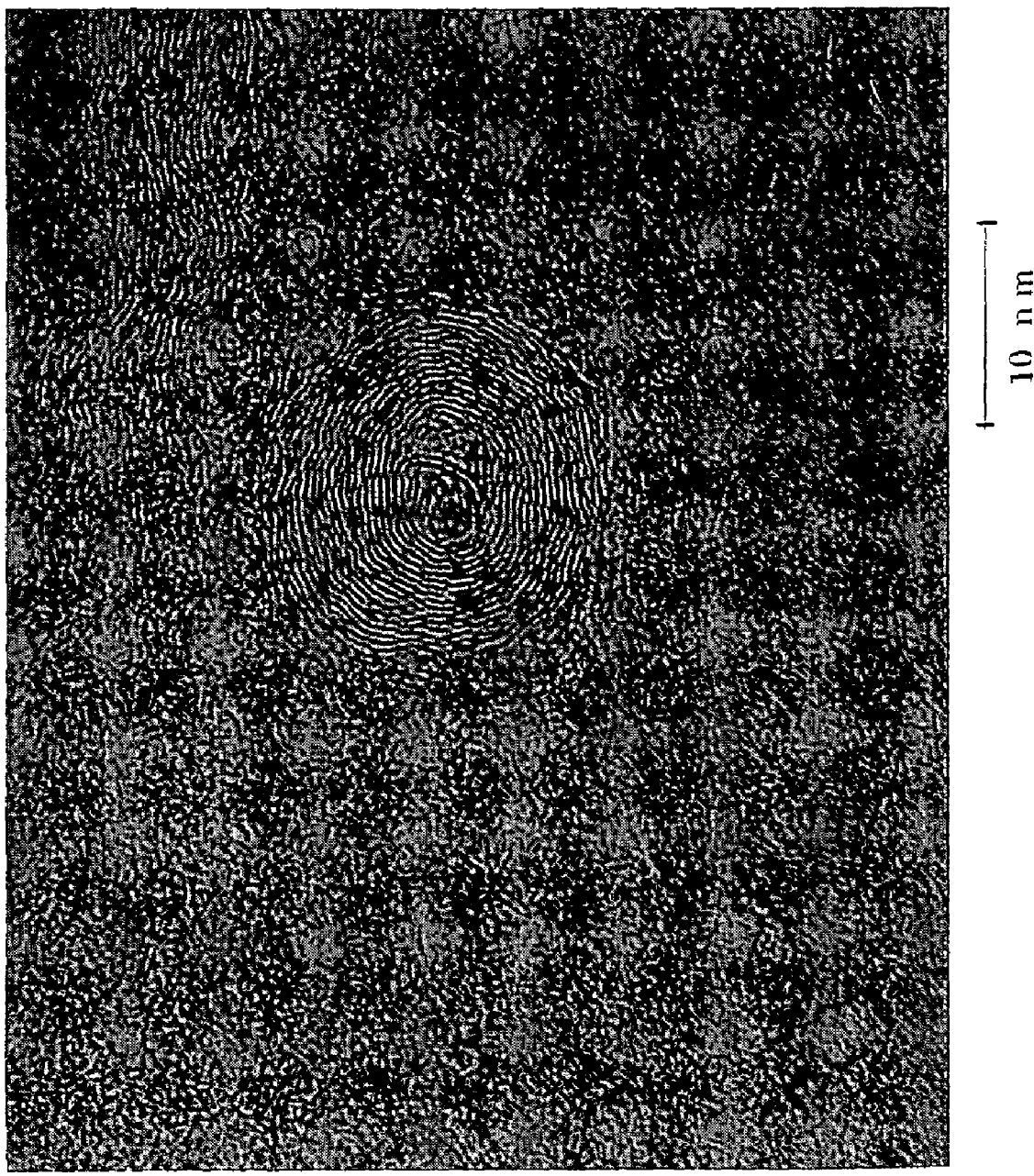
FIG. 5A is a transmission electron micrograph of the fine carbon fiber of the present invention.
Figure 5B:
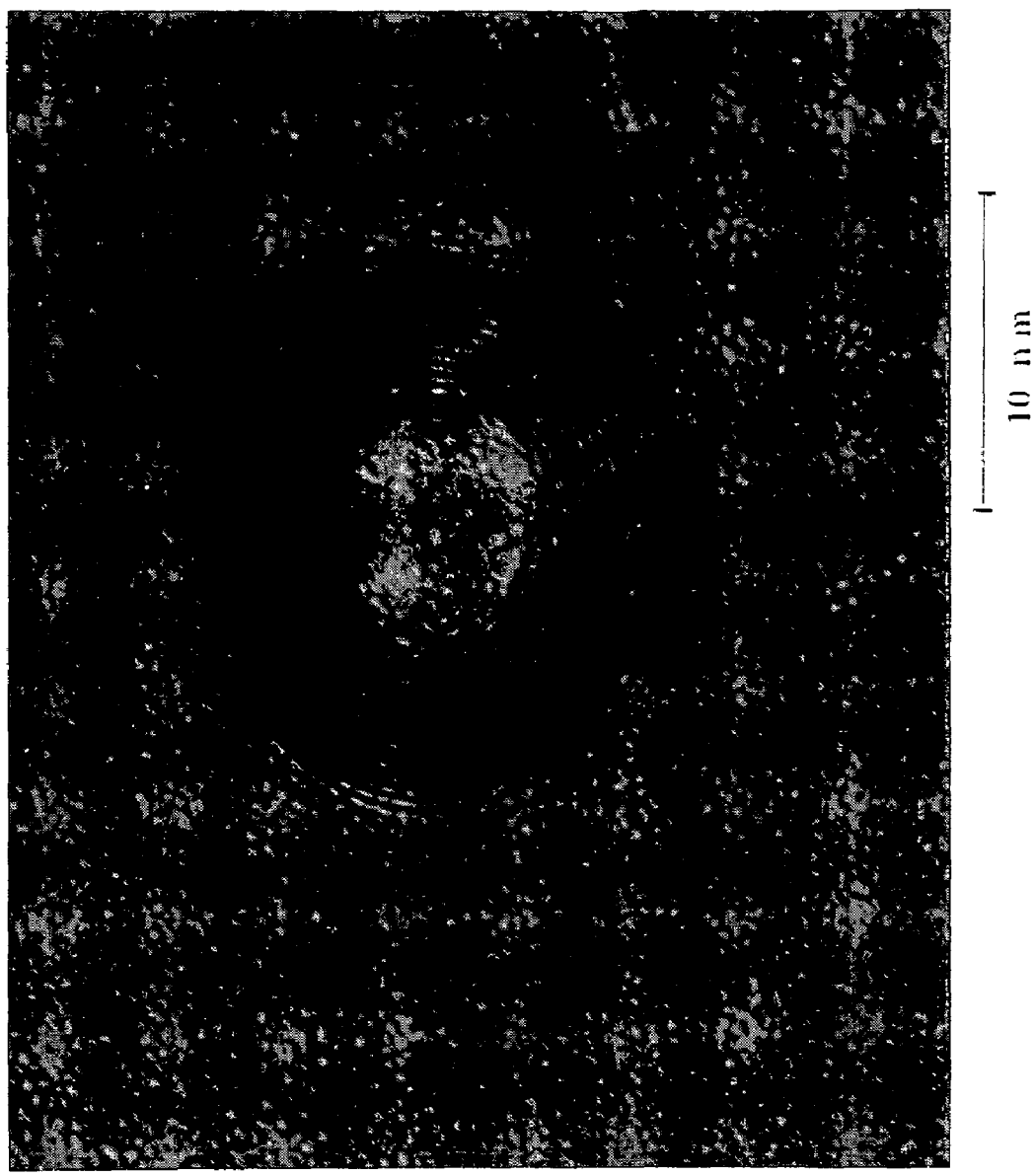
FIG. 5B is a transmission electron micrograph of the fine carbon fiber of the present invention.

The fine carbon fiber of the present invention was embedded and fixed in a heat curing resin, and ground to form a cross-sectional surface perpendicular to the direction of carbon fiber (longitudinal direction). The cross-sectional surfaces were observed on transmission electron microscope. FIGS. 5A and 5B are transmission electron micrographs of the cross-sections. As will be apparent from FIGS. 5A and 5B, the shape of cross-section is polygonal and annual rings of sheath of carbon layers (carbon sheets) arranged concentrically around the hollow part are bound to each other.

When the hollow center portion 11 at a portion in which the thickness e of the carbon layers 12 varies is subjected to electron diffraction, the resultant diffraction profile is asymmetrical. At the portion, the structures of the carbon layers differ partially; i.e., the structure of the carbon fiber is not uniform.

Measurement of Raman spectrum of the fine carbon fiber of the present invention revealed that the intensity ratio R of so-called D peak having an absorption in the vicinity of 1,360 cm$^{-1}$ to so-called G peak having an absorption in the vicinity of 1,580 cm$^{-1}$ ($I_D/I_G$) is about 0.6 to about 1.6 for the carbon fiber subjected to the heat treatment at 900 to 1,500° C. and about 0.1 to about 1 for the carbon fiber subjected to 2,000 to 3,000° C.

The value R could not reach 0.1 or less no matter how high the temperature of the heat treatment was.

Furthermore, the interplane distance $C_0$ by X-ray diffraction according to the Gakushin method (Carbon, No. 36, p.25–34 (1963)) was 6.70 to 6.95 Angstroms (0.670 to 0.695 nm) for the fiber subjected to the heat treatment at 900 to 1500° C. and 6.70 to 6.90 Angstroms (0.670 to 0.690 nm) for the fiber subjected to the high temperature heat treatment at 2,000 to 3,000° C.

As described above, the fine carbon fiber of the present invention has a non-uniform outer diameter or an imperfect columnar shape. Therefore, when the carbon fiber is incorporated into resins, rubbers or the like, the carbon fiber exhibits an excellent adhesion to the resin or the like, as compared with conventional carbon fibers, so that the carbon fiber can be added to the resin as a filler material without the carbon fiber being subjected to any pre-treatment.

When the fine carbon fiber of the present invention is incorporated, as a conducting filler, into resins in an amount of about 10 mass % or more, preferably about 15 mass % or more, adhesion of the carbon fiber to the resin, rubber or the like is improved due to the structural feature of the carbon fiber.

The fine carbon fiber of the present invention is obtained as an elongate fiber having an outer diameter of about 1 to about 80 nm and an aspect ratio of 10 to 30,000. Therefore, the carbon fiber can be compounded as a filler material in large amounts, and the carbon fiber exerts excellent reinforcing effects and is excellent in processability.

As described above, some end surfaces of the carbon layers are exposed to the outside (open). Therefore, when it is used as an additive in a battery, the carbon fiber of the present invention exhibits an excellent ability to catch ions. Furthermore, the conductivity of the carbon fiber is the same as that of conventional vapor-grown carbon fibers. In addition, the carbon fiber of the present invention has a rough surface, and thus exhibits an excellent wettability to an electrolytic solution in a battery. Therefore, the carbon fiber of the present invention is suitable as an additive to be incorporated in a battery.

BEST MODE FOR CARRYING OUT THE INVENTION

The present invention will next be described in more detail by way of example, which should not be construed as limiting the invention thereto.

EXAMPLE 1

Figure 2:
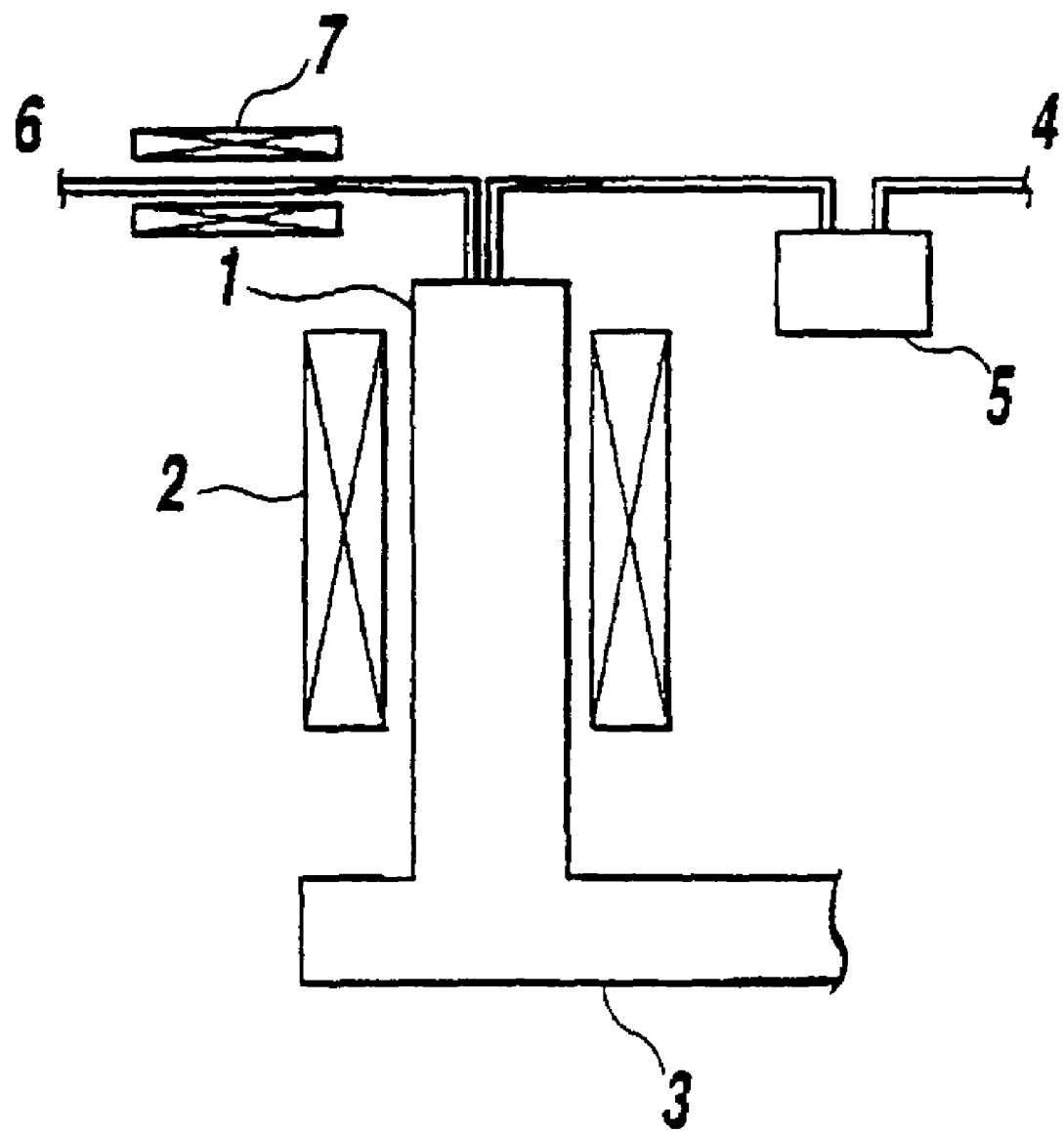
FIG. 2 shows a schematic representation of a production apparatus used in the Example, which includes a vertical heating furnace.

FIG. 2 shows a schematic representation of a production apparatus for producing a fine carbon fiber. The apparatus includes a vertical heating furnace 1 (inner diameter: 170 mm, length: 1,500 mm); a raw material feed pipe 4 for introducing a raw material vaporized in a raw material vaporization apparatus 5; and a carrier gas feed pipe 6 for feeding a carrier gas heated in a carrier gas heating apparatus 7, the pipes being provided on the top of the furnace. The raw material feed pipe 4 is provided such that an end thereof is adjusted to be disposed at a position in a temperature region in the furnace where the temperature is 1,000° C.

A benzene solution containing ferrocene (4 mass %) and thiophene (2 mass %) was vaporized, and fed through the raw material feed pipe 4 at a rate of 18 g/minute to the heating furnace while the temperature of the vaporized solution was maintained at 200° C. Separately, hydrogen serving as a carrier gas was heated to 600° C. in the carrier gas heating apparatus 7, and fed at a rate of 100 L/minute to the heating furnace, and the both gases were reacted at 1,000° C.

The fine carbon fiber produced through the reaction was collected, and subjected to heat treatment at 1,300° C. for 20 minutes in an Ar atmosphere. Then a portion of the resultant carbon fibers was further subjected to heat treatment at 2,800° C. for 20 minutes in an Ar atmosphere.

The both carbon fibers obtained through heat treatments at 1,300° C. and 2,800° C., respectively, have a multi-layer sheath structure in which layers of carbon atoms are superposed one on another and the carbon layers are partially broken or discontinuous in a longitudinal direction as observed by TEM and shown in FIGS. 5A and 5B. In addition, the carbon layers have portions where the sheath-forming carbon layers constituting the multilayer structure differ in thickness at positions symmetrical with respect to the center axis of the hollow center portion (left hand and right hand positions in FIGS. 5A and 5B).

Most carbon fibers produced through the above production process had an outer diameter falling within a range of about 10 to 50 nm and an aspect ratio of tens or more. The majority of the carbon fibers had a structural feature such that the sheath-forming layers of carbon atoms were disrupted and the outer diameter was not uniform. There were also obtained carbon fibers in which variations in the outer diameter of each fiber and in the diameter of a hollow center portion of the fiber were 10 and some percents (%).

The conductivity of the fine carbon fiber of the present invention was similar to that of conventional VGCF having a diameter of 100 nm or more.

INDUSTRIAL APPLICABILITY

The fine carbon fiber according to the present invention differs from conventional carbon fibers such as PAN or conventional vapor grown carbon fibers (VGCF), and have an outer diameter as small as about 1 to about 80 nm and an aspect ratio of 10 to 30,000. Since sheath-forming carbon layers constituting each carbon fiber are partially disrupted, the carbon fibers can be used as the conducting filler in resins, rubbers and the like without the carbon fibers being subjected to surface treatment. Alternatively, since the carbon fiber of the present invention exhibits excellent wettability to an electrolytic solution, the carbon fiber can be used as an additive in a battery.

What is claimed is:

1. A fine carbon fiber having an outer diameter of about 1 to about 80 nm, an aspect ratio of 10 to 30,000, R value ($I_D/I_G$) by Raman spectrophotometry of about 0.6 to about 1.6, and an interplane distance $C_0$ by X-ray diffraction of 6.70 to 6.95 Angstroms, and having a cross-section perpendicular to the longitudinal direction of the carbon fiber being of a polygonal shape, comprising a hollow center portion and substantially a multi-layer sheath structure of a plurality of carbon layers.

2. A fine carbon fiber having an outer diameter of about 1 to about 80 nm, an aspect ratio of 10 to 30,000, R value ($I_D/I_G$) by Raman spectrophotometry of about 0.1 to about 1, and an interplane distance $C_0$ by X-ray diffraction of 6.70 to 6.90 Angstroms, and having a cross-section perpendicular to the longitudinal direction of the carbon fiber being of a polygonal shape, comprising a hollow center portion and substantially a multi-layer sheath structure of a plurality of carbon layers.

3. The fine carbon fiber as claimed in claim 1 having a cross-section perpendicular to the longitudinal direction of the carbon fiber being of a polygonal shape, comprising a hollow center portion and a multi-layer sheath structure of a plurality of carbon layers in the form of annular rings around the hollow part.

4. The fine carbon as claimed in claim 2, having a cross-section perpendicular to the longitudinal direction of the carbon fiber being of a polygonal shape, comprising a hollow center portion and a multi-layer sheath structure of a plurality of carbon layers in the form of annular rings around the hollow part.

5. Fine carbon fiber having an outer diameter of about 1 to about 80 nm and an aspect ratio of 10 to 30,000, comprising the fine carbon fiber as claimed in any one of claims 1 to 4 in an amount of about 10 mass % or more.

* * * * *